(12) United States Patent
Martinez et al.

(10) Patent No.: US 7,610,386 B1
(45) Date of Patent: Oct. 27, 2009

(54) STATEFUL MESSAGING GATEWAY

(75) Inventors: Frank Martinez, La Canada, CA (US);
Paul Kevin Toth, Daly City, CA (US)

(73) Assignee: Blue Titan Software, Inc., San Francisco, CA (US)

( * ) Notice: Subject to any disclaimer, the term of this patent is extended or adjusted under 35 U.S.C. 154(b) by 723 days.

(21) Appl. No.: 10/425,584

(22) Filed: Apr. 29, 2003

(51) Int. Cl.
*G06F 15/16* (2006.01)
*G06F 15/173* (2006.01)

(52) U.S. Cl. ............... 709/227; 709/224

(58) Field of Classification Search ......... 709/217–219, 709/238, 223–237, 203–7
See application file for complete search history.

(56) References Cited

U.S. PATENT DOCUMENTS

| | | | | |
|---|---|---|---|---|
| 5,864,854 | A * | 1/1999 | Boyle | 707/10 |
| 6,466,949 | B2 * | 10/2002 | Yang et al. | 707/201 |
| 6,792,605 | B1 * | 9/2004 | Roberts et al. | 719/313 |
| 6,823,369 | B2 * | 11/2004 | Leach et al. | 709/206 |
| 6,947,992 | B1 * | 9/2005 | Shachor | 709/228 |
| 7,089,307 | B2 * | 8/2006 | Zintel et al. | 709/224 |
| 7,296,061 | B2 * | 11/2007 | Martinez et al. | 709/211 |
| 2002/0147652 | A1 * | 10/2002 | Gheith et al. | 705/26 |
| 2003/0097464 | A1 * | 5/2003 | Martinez et al. | 709/238 |
| 2004/0068573 | A1 * | 4/2004 | Corbeil | 709/229 |

\* cited by examiner

*Primary Examiner*—Yasin M Barqadle
(74) *Attorney, Agent, or Firm*—Baker Botts L.L.P.

(57) ABSTRACT

Methods, apparatuses and systems facilitating the support of stateful messaging protocols in web services and other network environments comprising a plurality of distributed control points. The present invention supports Web service protocols, such as SOAP-Conversation, that introduce an element of statefulness into a Web service invocation, ensuring that use of such protocols is enabled and, in some embodiments, enhanced in web services networks implemented by a plurality of distributed control points or routing nodes. As discussed above, a fundamental requirement introduced by stateful protocols is that, once an endpoint initializes stateful data (such as a session, context, or conversation token) in response to a Web service invocation, all subsequent messages associated with that conversation instance or stateful data must be routed to that endpoint. In other words, the consuming applications requiring access to functionality dependent on stateful data must have an affinity for the endpoint on which the state data resides for as long as the dependency persists. The invention provides methods, apparatuses and systems directed to ensuring that the control points implement this affinity. For each stateful conversation, certain embodiments of the present invention maintain a set of routing rules that track the usage of such protocols and make sure sequences of messages that must be sent to the same endpoint are properly dispatched. The present invention can be applied to a variety of web- or application-service network architectures comprising a plurality of distributed control points or routing nodes.

19 Claims, 5 Drawing Sheets

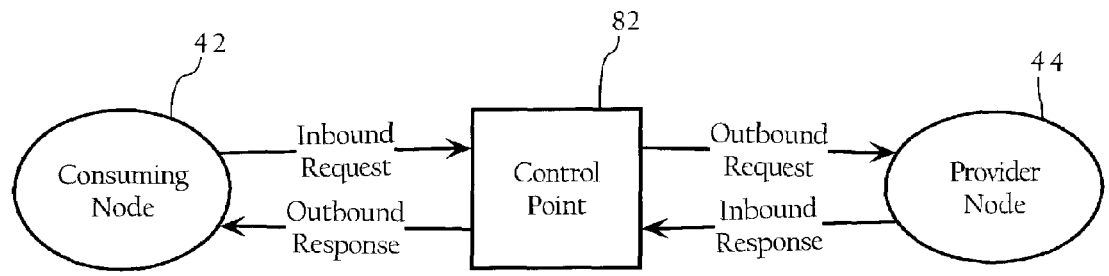
Fig._1A
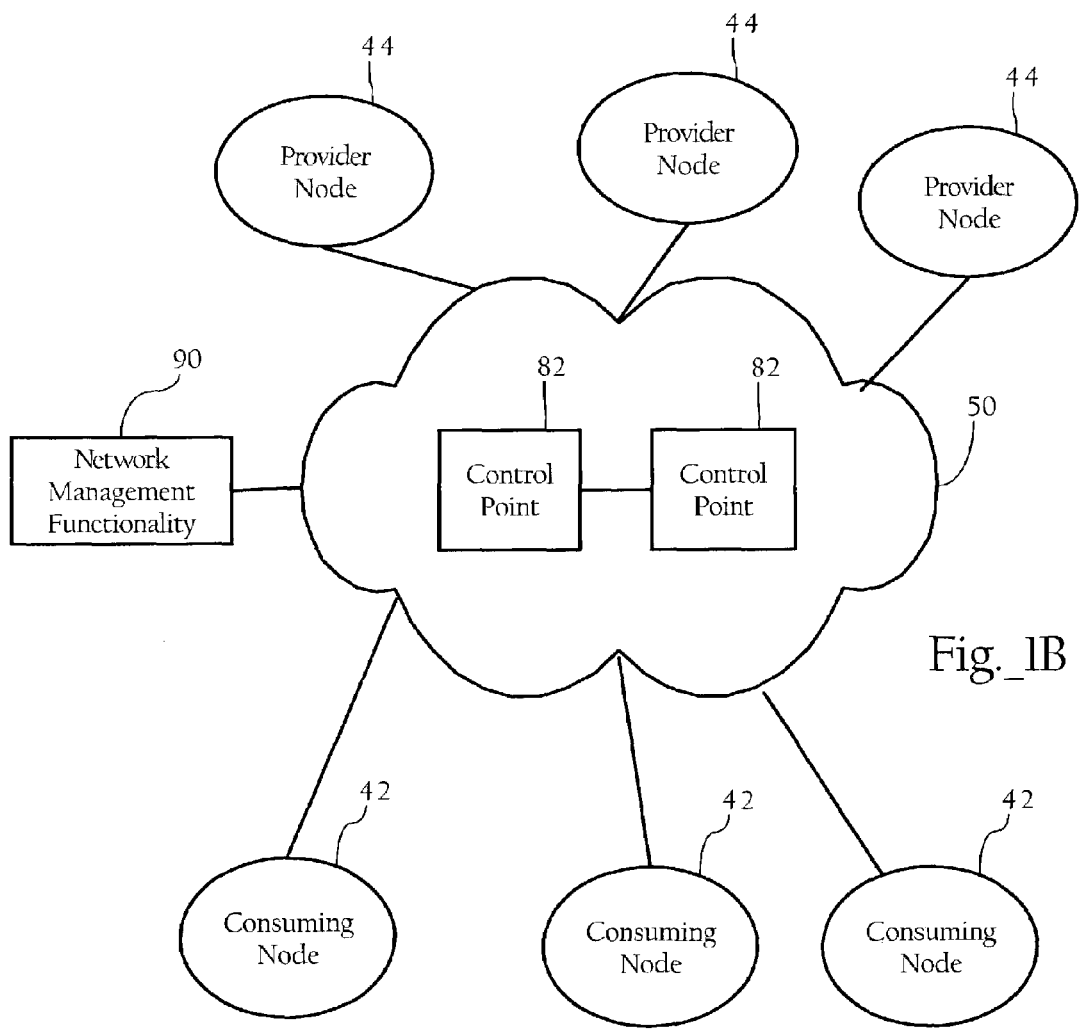
Fig._1B

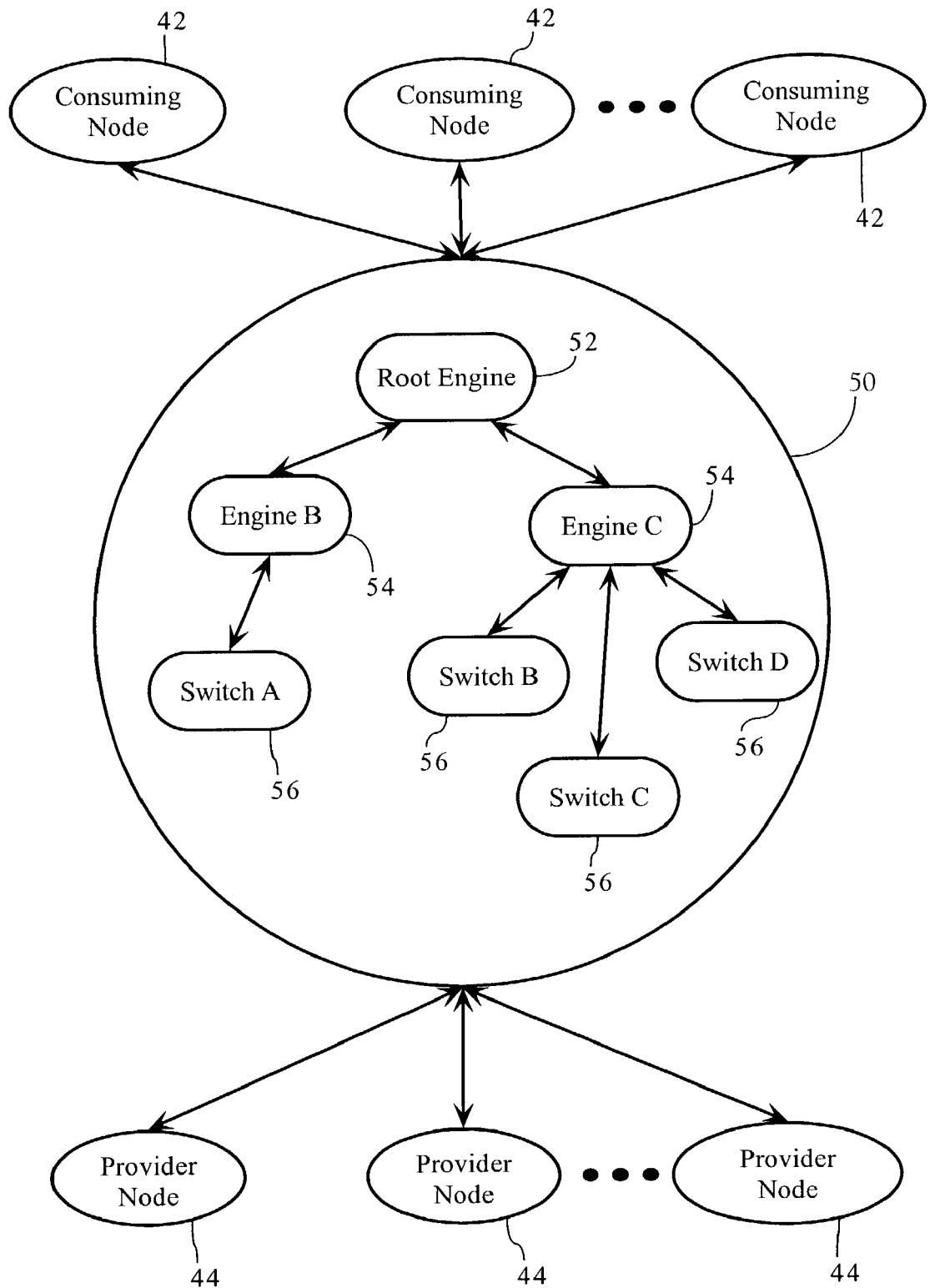
Fig._2

STATEFUL MESSAGING GATEWAY

CROSS REFERENCE TO RELATED APPLICATIONS

The present application makes reference to the following commonly owned U.S. patent applications, which are incorporated herein by reference in their entirety for all purposes:

U.S. patent application Ser. No. 09/990,722 in the name of Frank Martinez and Paul Toth, entitled "Distributed Web Services Network Architecture."

U.S. patent application Ser. No. 10/350,644 in the name of Parand Tony Darugar, Frank Martinez, and Paul Toth, entitled "Network Publish/Subscribe System Incorporating Web Services Network Routing Architecture;"

U.S. patent application Ser. No. 10/350,645 in the name of Parand Tony Darugar, Frank Martinez, and Paul Toth, entitled "Network Publish/Subscribe System Incorporating Web Services Network Functionality;" and U.S. patent application Ser. No. 10/387,197 in the name of Frank Martinez, Paul Toth, and Parand Tony Darugar, entitled "Web-Services Based Computing Resource Lifecycle Management."

FIELD OF THE INVENTION

The present invention relates to network resources and, in one particular embodiment, to methods, apparatuses and systems facilitating transport mediation of messages associated with stateful communications between consuming nodes and provider nodes.

BACKGROUND OF THE INVENTION

Web services networks are rapidly evolving technology architectures allowing applications to tap into a variety of services in an extremely efficient and cost effective manner. Web services enable cost-effective and efficient collaboration among entities within an enterprise or across enterprises. Web or application services are network addressable computing resources that exchange data and execute processes. Essentially, Web services are applications exposed as services over a computer network and employed by other applications using Internet standard technologies, such as XML, SOAP, WSDL, etc. Accordingly, Web applications can be quickly and efficiently assembled with services available within an enterprise LAN or external services available over open computer networks, such as the Internet.

A Web services network can be deployed across an enterprise LAN or across a Wide Area Network, such as the Internet. A typical Web services network includes at least one network services broker or gateway that is operative to receive a service request and route the service request to the appropriate resource. A broker is a specially configured server or cluster of servers acting as an intermediary for Web service requests and responses. As Web services network usage increases, however, the broker can become a bottleneck. To ease this bottleneck, the prior art solution is simply to add additional processing power to the broker (e.g., additional servers), which is costly, inefficient, and fails to leverage the enterprise's investments in its existing network infrastructure. Moreover, the centralized nature of the broker creates reliability concerns in that failure of the broker disables the applications accessing services through it. Accordingly, U.S. application Ser. No. 09/990,722 discloses a distributed Web services network architecture that, among other things, alleviates the bottleneck and point-of-failure concerns discussed above.

As the use of Web services network architectures expands, the complexity of the processes that utilize Web- or application-services increases as well. For example, various stateful messaging protocols have been developed to support complex or coordinated interactions between various endpoints in a web services network. For example, SOAP Conversation (SOAP-Conversation) is a SOAP- and WSDL-based specification that defines long-running and asynchronous interactions between SOAP-based senders and receivers. A SOAP-Conversation is expressed as a SOAP header entry within a SOAP envelope. In addition, WS-ReliablingMessaging is another SOAP and WSDL based specification that provides delivery assurances that a given message reached its ultimate destination. WS-Coordination and WS-Transaction are further examples of other SOAP- and WSDL-based protocols that introduce elements of statefulness. A fundamental requirement introduced by stateful protocols is that, once an endpoint initializes stateful data (such as a session, context, or conversation token) in response to a Web service invocation, then all subsequent messages referencing or requiring that stateful data must be routed to that same endpoint.

While, in theory (or at least where only a single endpoint supports a given web service), adherence to this requirement appears to be somewhat straightforward, complying with this requirement becomes quite complex where the web services network environments comprises multiple control points, and the given web- or application-service is supported by multiple endpoints. Specifically, as discussed in U.S. application Ser. No. 09/990,722, a consuming application invokes a given web service by composing a request identifying a service operation and transmitting it to a control point. The control point accesses a routing table or web services network directory to, among other things, identify and select an endpoint location (often from a plurality of possible endpoint locations). The request is then forwarded to the selected endpoint. Problems can arise, however, when the consuming application transmits subsequent messages associated with an existing conversation to another control point, which has no state or other information concerning the existing conversation between the consuming application and the selected endpoint. Specifically, without any coordination mechanism, the message may be forwarded to an endpoint that is not involved in the existing conversation.

In light of the foregoing, a need in the art exists for methods, apparatuses and systems facilitating the support of stateful messaging protocols in web services and other network environments comprising a plurality of distributed control points or routing nodes. Embodiments of the present invention substantially fulfill this need.

SUMMARY OF THE INVENTION

The present invention provides methods, apparatuses and systems facilitating the support of stateful messaging protocols in web services and other network environments comprising a plurality of distributed control points. The present invention supports Web service protocols, such as SOAP-Conversation, that introduce an element of statefulness into a Web service invocation, ensuring that use of such protocols is enabled and, in some embodiments, enhanced in web services networks implemented by a plurality of distributed control points or routing nodes. As discussed above, a fundamental requirement introduced by stateful protocols is that, once an endpoint initializes stateful data (such as a session, context, or conversation token) in response to a Web service invocation, all subsequent messages associated with that conversation instance or stateful data must be routed to that endpoint. In other words, the consuming applications requiring access to functionality dependent on stateful data must have an affinity for the endpoint on which the state data resides for as long as the dependency persists. The invention provides methods, apparatuses and systems directed to ensuring that the control points implement this affinity. For each stateful conversation, certain embodiments of the present invention maintain a set of routing rules that track the usage of such protocols and make sure sequences of messages that must be sent to the same endpoint are properly dispatched. The present invention can be applied to a variety of web- or application-service network architectures comprising a plurality of distributed control points or routing nodes.

In one embodiment, the present invention integrates publish/subscribe functionality that includes topics directed to various aspects of the web services network fabric itself to distribute state information. Certain embodiments of the present invention reduce the complexities associated with distributing state information across a large number of routing nodes by creating a set of "specialized" routing nodes that handle stateful protocols. The invention also contemplates the support of protocols where state tokens expire.

DESCRIPTION OF THE DRAWINGS

FIG. 1A is a functional block diagram illustrating the message flows associated with a web services invocation.

FIG. 1B is a functional block diagram illustrating a computer network environment according to an embodiment of the present invention.

FIG. 2 is functional block diagram setting forth the network architecture associated with an embodiment of the present invention.

DESCRIPTION OF PREFERRED EMBODIMENT(S)

Figure 3:
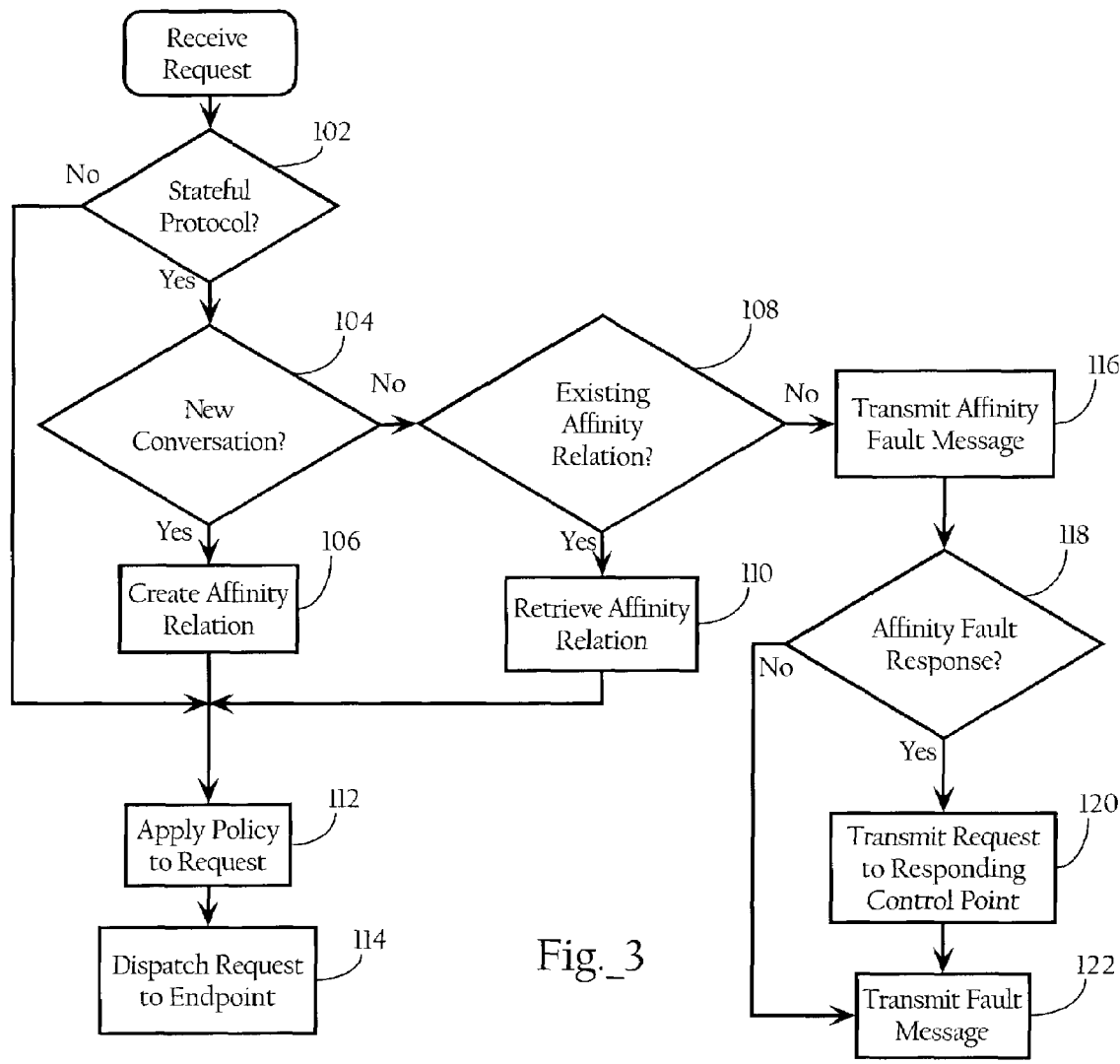
FIG. 3 is a flow chart diagram illustrating a method, according to an embodiment of the present invention, for processing web service invocations associated with stateful and non-stateful protocols.

FIGS. 1A and 1B are functional block diagrams illustrating the functionality and basic operating elements associated with an embodiment of the present invention. Provider node 44 is a network addressable computing resource operably connected to computer network 50. In one embodiment, provider node 44 is an end-system that hosts a Web- or other network-based application accessible to consuming applications using predefined interfaces and protocols. Consuming node 42 is a network addressable end-system that consumes or invokes the computing resources associated with one or more provider nodes 44. In one embodiment, consuming node 42 hosts a Web-based application that consumes one or more Web services hosted by one or more provider nodes 44, as discussed more fully below. Computer network 50 generally refers to a variety of computer network architectures including one or more intermediate systems operative to route messages between end-systems operably connected thereto. As FIG. 1 illustrates, computer network 50 includes at least one control point 82 operative to route messages between provider nodes 44 and consuming nodes 42. In one embodiment, computer network 50 is a Web services network infrastructure that supports the routing of service operation requests and responses between Web services consumers 42 and Web services providers 44. In the context of Web or application service infrastructures, control point 82 may be implemented as a Web services network broker or gateway, or as a proxy in a peer-to-peer Web services network architecture. As discussed herein and as FIG. 2 illustrates, control point 82 may also be a routing node (see FIG. 2, engine 54 or switch 56) in a distributed Web services network architecture according to U.S. application Ser. No. 09/990,722. Control point 82 may be one of a plurality of distributed brokers or gateways in a web services network environment.

Control point 82 processes messages transmitted across computer network 50 between provider nodes 44 and consuming nodes 42. In one embodiment, control point 82 is operative to process Web service operation requests transmitted by consuming nodes 42. For example, control point 82 may be a routing node, such as an engine or switch in a distributed Web services network architecture, operative to mediate the transport of messages between consuming nodes 42 and provider nodes 44. FIG. 1A illustrates the message types, relative to control point 82, associated with invocation of provider node 44. In one embodiment, the functionality associated with control point 82 includes policy execution (e.g., transformation of messages from one format to a second format, security policies, access control policies, etc.), routing and dispatch. In one embodiment, control point 82 comprises a control point module including the transport mediation logic and functionality discussed herein, a routing table or web services network directory allowing for the routing of service operation requests, and a state cache maintaining state information for stateful conversations between providing and consuming nodes, as discussed more fully below.

Network management functionality 90 generally refers to the interface and related functionality associated with network fabric services associated with one or more control points 82. In one embodiment, network management functionality 90 provides the interface by which the operational parameters (e.g., routing table entries, etc.) of one or more control points 82 are configured. In the context of Web services networks, network management functionality comprises a management platform facilitating management and configuration tasks associated with a Web services network infrastructure, such as registration and discovery of Web services. Registration, discovery and provisioning of Web services is disclosed in U.S. application Ser. No. 10/387,197, identified above.

As discussed in U.S. application Ser. Nos. 09/990,722 and 10/387,197, web services network architectures comprise one or more control points that mediate the transport of messages between consuming nodes and providing nodes. FIG. 1A illustrates the message types and message flow associated with a web service invocation involving a control point 82, where the message types are named relative to the control point 82. As FIG. 1A illustrates, to invoke a web service hosted by provider node 44, a consuming node 42 composes a request and transmits to a control point 82 associated with the web services network fabric. Using information in the inbound request, the control point 82 determines the endpoint location of the provider node 44 and forwards the message (outbound request) to it. The provider node 44 responds to the message and transmits a response (inbound response) to the control point 82, which forwards the response (outbound response) to the consuming node 44.

As the above identified applications indicate, the control point 82 can execute various policies to each of the message types. For example, as disclosed in U.S. application Ser. No. 09/990,722 a control point 82 may apply access control policies to inbound requests to determine whether the consuming node is authorized to access a given web service. In addition, as disclosed in U.S. application Ser. No. 10/387,197, a control point 82 may transform an inbound request formatted according to a first binding type supported by the control point 82 to an outbound request formatted according to a second binding type supported by the provider node 44. The selection of the second binding type, for example, can be a matter of policy configurable by a network administrator. As discussed below, however, different policies and policy types may be applied to each of the message types (inbound request, outbound request, inbound response and outbound response).

As discussed above, the present invention is directed to supporting stateful messaging or communications protocols between consuming and provider nodes in a computer network environment comprising a plurality of control points that mediate the transport of messages between the consuming and provider nodes. As discussed below, in one embodiment, the control points associated with the network environment exchange state information corresponding to existing conversations to preserve the integrity of the conversations between a consuming application and a given endpoint. In some embodiments, the present invention ensures that the same control point is used to mediate the transport of messages in a given conversation. In other embodiments of the present invention, the control points can be configured to exchange or share state information so that each control point can mediate message transport and preserve the integrity of the conversation or session.

FIG. 3 illustrates a method, according to an embodiment of the present invention, directed to the processing of requests associated with an invocation of a network resource involving both stateful and non-stateful protocols. As FIG. 3 illustrates, control point 82 receives a request from a consuming node 42 and determines whether the request implicates a stateful protocol (102). Control point 82 can determine whether a request implicates a stateful protocol, in one embodiment, by examining the request headers for elements identifying a stateful protocol. For example, for SOAP Conversations, the request header may include a SOAP Conversation header in the SOAP envelope, such as a StartHeader or ContinueHeader. In conversations using WS-ReliableMessaging protocols, the messages may include <sequence> elements and the like. Still further, communications involving WS-Coordination protocols may include CoordinationContext elements. One skilled in the art will recognize that other stateful protocols can be detected by inspection of request elements, such as request header fields, that indicate a given protocol.

If the request indicates a stateful protocol, control point 82 then determines whether the request is part of a new conversation (104). Identifying a new conversation is again accomplished by examination of the request or other message elements. For example, in SOAP Conversations, a request or other message initiating the conversation may include a StartHeader and a conversationID. If the request initiates a new conversation, control point 82 creates a new affinity relation in its state cache (106). In one embodiment, an affinity relation entry in the state cache comprises 1) the computer network address of the consuming application, 2) the endpoint URI or other locator of provider endpoint (as obtained from the routing information maintained by control point 82), 3) a state token (e.g., a conversationID, etc.), and 4) other protocol-specific state information. A variety state information can be stored; for example, in SOAP conversations, control point 82 can store the "callback" location contained in a Callback-Header. In addition, detection of a stateful protocol may occur upon receipt by the control point 82 of an inbound response from provider node 44. In some embodiments, control point 82 can, at that point, create a corresponding affinity relation entry in its state cache.

If the request is part of an existing conversation, control point 82 accesses its state cache against the state token in the request (e.g., conversationID in SOAP Conversations) to determine whether it includes a corresponding affinity relation entry (108). If so, control point retrieves the information in the affinity relation entry (110). As FIG. 3 illustrates, control point 82, in one embodiment, applies a policy to the request, such as access control (see U.S. application Ser. No. 09/990,722) (112) and dispatches the request to a service endpoint (114).

As discussed in U.S. application Ser. Nos. 09/990,722 and 10/387,197, control point 82, in one embodiment, maintains routing entity information allowing for the routing of service operation requests that identify a service operation by service and operation name. As discussed in these applications, a given service or service operation may be associated with a plurality of endpoint locations. Accordingly, when a control point 82 receives a request identifying a service operation by name, it accesses a routing table to identify the endpoint URI or network address associated with the service operation and dispatches the request to the endpoint using the located/selected URI or network address. When a given web- or application-service is associated with a plurality of endpoint locations, two requests transmitted from a given consuming node identifying the same service may, in the absence of the invention, be transmitted to two different endpoint locations. As FIG. 3 illustrates, however, for stateful protocols, control point 82 uses the endpoint location in the affinity relation entry in its state cache to ensure that the messages associated with a given conversation are routed to the same endpoint location.

Furthermore, as FIG. 3 illustrates, if the request is part of an existing conversation (104), but the state cache does not include a corresponding affinity relation entry (108), control point 82 assumes that another control point in the web services network infrastructure handled mediation of the prior messages in the conversation and, therefore, attempts to locate that control point. In one embodiment, control point 82 transmits an affinity fault message to all control points 82 in the web services network infrastructure (116). In one embodiment, the affinity fault message includes state information, such as the consuming and provider endpoint locations, a state token (e.g., conversationID), etc. If the control point 82 receives an affinity fault response from another control point (118), it forwards the request to the responding control point 82 for processing as described herein (120). If no affinity fault response is received in a threshold period of time, control point 82 transmits a fault message to the consuming endpoint (122).

Figure 4:
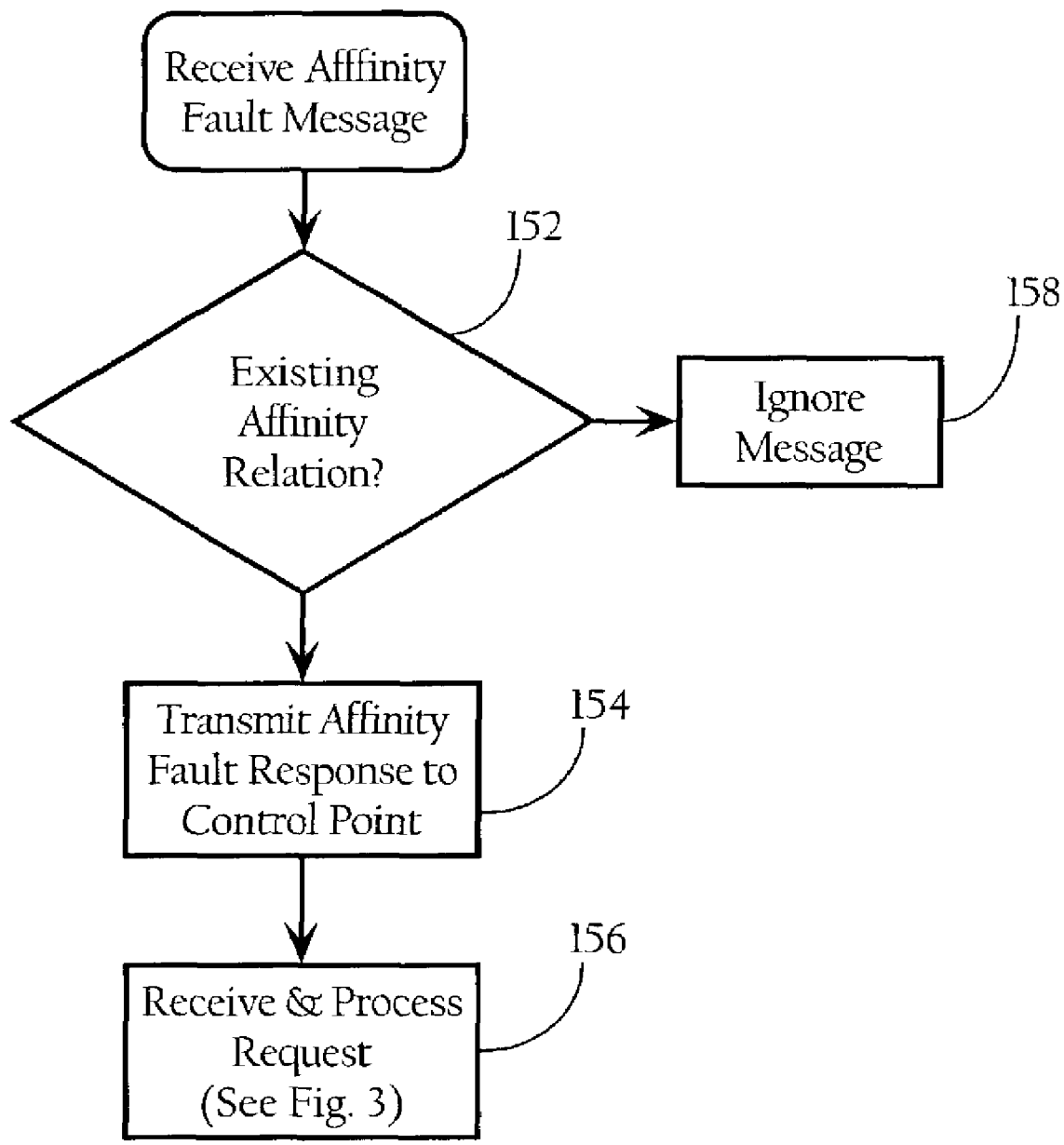
FIG. 4 is a flow chart diagram showing a method, according to an embodiment of the present invention, directed to processing affinity fault messages.

FIG. 4 illustrates a method, according to an embodiment of the invention, directed to processing affinity fault messages transmitted by control points. As FIG. 4 illustrates, in response to an affinity fault message, control point 82 scans its state cache against the information in the affinity fault message to determine whether the state cache includes a corresponding affinity relation entry (152). If not, control point 82 simply ignores the request (158). If the state cache does include a corresponding affinity relation entry, the control point 82 transmits an affinity fault response (154) to receive and process the request (156), as described above.

Figure 5:
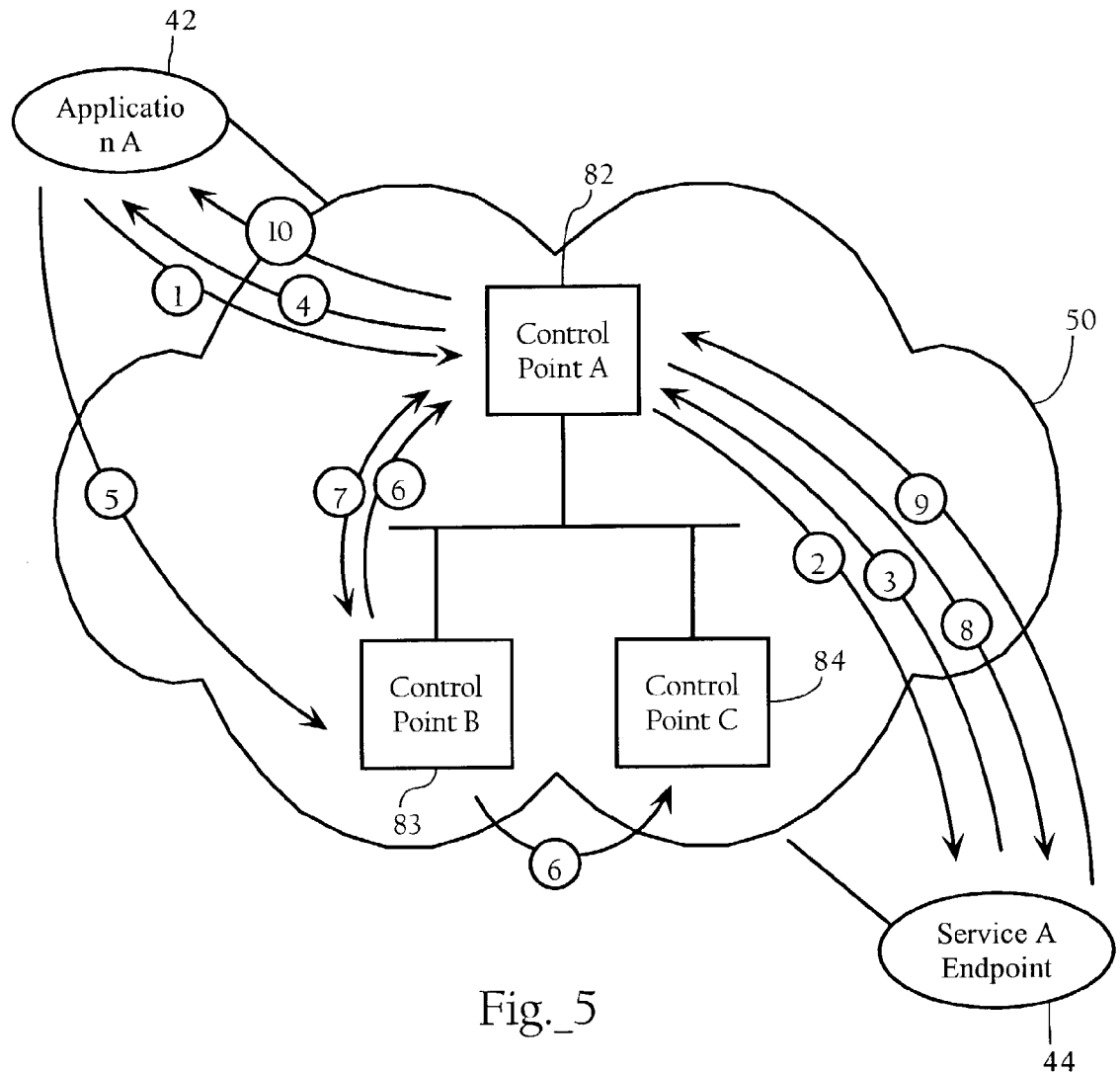
FIG. 5 is a functional block diagram showing the process and message flow according to an embodiment of the present invention.

FIG. 5 illustrates the process and message flow according to an embodiment of the present invention, where the network environment ensures that the same control point mediates transport of all messages associated with a given conversation. A consuming application, Application A 42, invokes a Web service (here, Service A hosted by Service Endpoint A), using a stateful protocol such as SOAP-Conversation. As discussed above, a control point (here, control point A 82) receives the request (FIG. 5, Ref. No. 1) and dispatches the request to Service Endpoint A 44 (Ref. No. 2). As discussed above, control point A 82 notes that a stateful protocol was used and registers an affinity relation between application A 42 and service endpoint A in its state cache. Service Endpoint A 44 receives the request from control point A 82 and transmits a response (Ref. No. 3) which is forwarded to Application A (Ref. No. 4). Application A invokes Service A again (Ref. No. 5), but this time it does so using a control point other than control point A 82 (in FIG. 5, control point B 83). Control point B 83 receives the message sent by Application A, identifies it as a message associated with an existing conversation, checks its state cache, and realizes that it cannot map the message to a specific endpoint, because it lacks an affinity relation entry referring to the conversation in which application A is engaged. Control point B 83 transmits to control points 82 and 84 an affinity fault message (Ref. No. 6) containing session-specific information, such as the service operation being invoked and any relevant tokens, such as a conversationID. Control point A 82 receives the affinity fault message, checks its state cache and determines that it is the "rightful" recipient of the request received by control point B 83. Control point A 82 sends an affinity fault response to control point B 83, as discussed above (Ref. No. 7). Control point B sends the request message it received from Application A 42 to control point A 82 (Ref. No. 7). Control point A 82 processes the request message originally received by control point B, sending it to endpoint A (Ref. No. 8). Service endpoint A receives the request and transmits a response (Ref. No. 9), which control point 82 forwards to application A (Ref. No. 10).

Other embodiments are possible. For example, control point A 82, in response to an affinity fault message can transmit to control point B 83 the affinity relation entry in its state cache, allowing control point B 83 to transmit the request to the appropriate endpoint (here, service endpoint A), or otherwise perform a transport mediation operation requiring state information. Some stateful protocols include use of a "time-to-live" or expiration date that limits the life a particular state token. For example, WS-ReliableMessaging allows expiration dates to be set for Sequences. Where relevant, control points can support these limitations by purging expired data from its state cache to help ensure that control points do not make decisions based on out-of-date state data.

Furthermore, in one embodiment, control points are configured to push newly-created affinity relation entries to all other control points to allow the control points to mediate the transport of messages associated with stateful conversations between consuming nodes and providing nodes directly, without having to transmit affinity fault messages. In distributed, hierarchical web services network architectures as disclosed in U.S. application Ser. No. 09/990,722, the affinity relation entries can be distributed to control points using an affinity relation creator and update service, similar to the routing entity creator and update services described in that application. In one embodiment, this distribution mechanism can be used in connection with the affinity fault messages to handle the situation where the corresponding affinity relation entry has not yet propagated to a given control point handling a request.

In one embodiment, the web services network infrastructure 50 uses control point specialization to reduce the number of affinity faults. In one such implementation, each control point in the web services network infrastructure includes an attribute representing its "specialization state," which is a list of specialized tasks for which that control point may be used. One such task is "stateful protocol support." In a Web service network where some control points are defined as having stateful protocol support, only those control points may be used to process messages using such protocols. In one embodiment, this restriction can be enforced to some extent by the dynamic WSDL-generation mechanism disclosed in U.S. application Ser. No. 10/387,197. Specifically, the dynamic WSDL-generation mechanism will produce bindings that "point" only to those control points that support the protocols through which the requested service is invoked. For example, if a service utilizes SOAP-Conversation, then the bindings contained in the WSDL produced for that service by the network management functionality will list only those control points possessing a specialization state specifying stateful protocol support. A control point that encounters a request involving non-supported protocol(s) can transmit a fault message, similar to an affinity fault message, to other control points in attempt to locate a control point that supports the protocol(s).

In one embodiment, the control points transmit state information, such as affinity fault messages and affinity relation entries, to other control points using standard mechanisms and protocols, such as HTTP, SOAP, etc. In one embodiment, however, control points provide affinity fault messages and affinity relation entries to other control points, using the publish/subscribe functionality described in U.S. application Ser. Nos. 10/350,644 and 10/350,645. For example, and in one embodiment, a publish/subscribe topic corresponding to affinity faults is configured, as described in the above-identified applications. An additional topic can be configured for affinity relation entries. As each control point is installed in the web services network infrastructure, a URI or other network address is added to the subscriber list associated with the affinity fault topic. Accordingly, each control point includes a topic listener for receiving affinity fault messages. Accordingly, when a given control point experiences an affinity fault, as described above, it posts a message to the affinity fault topic, causing all subscribing control points to receive the affinity fault message. Affinity relation entries can be distributed in a similar manner. In addition, use of the publish/subscribe system for transmitting affinity faults also allows other systems, such as logging or reporting nodes, to receive affinity fault information for administrative and reporting purposes.

Lastly, although the present invention has been described as operating in connection with end systems employing XML, SOAP, HTTP, TCP and IP protocols, the present invention has application in computer network environments employing any suitable Web services networking, session layer, transport layer and network layer protocols. Moreover, while embodiments of the present invention have been described as operating in connection with SOAP Conversation and WS-ReliableMessaging protocols, the present invention can be applied to support a wide variety of stateful communication protocols. Accordingly, the present invention has been described with reference to specific embodiments. Other embodiments of the present invention will be apparent to one of ordinary skill in the art. It is, therefore, intended that the claims set forth below not be limited to the embodiments described above.

What is claimed is:

1. An apparatus, comprising:
a state cache storing state information corresponding to at least one stateful conversation between a consuming node and a provider node;
a web services routing table comprising one or more routing table entries, the at least one routing table entry comprising a web service operation identifier and at least one endpoint location associated with the web service operation identifier; and,
a control point operative to:
mediate the transport of web service invocation messages and web service response messages between consuming nodes and providing nodes,
access, responsive to a first web service invocation message of the web service invocation messages identifying a web service operation, the web services routing table to identify a providing node to which the first web service invocation message is to be routed;
detect stateful conversations between consuming nodes and providing nodes based on attributes of the web service invocation messages and the web service response messages transmitted between the consuming and providing nodes, wherein the attributes include a session, context, or conversation token,
store, responsive to detection of initiation of stateful conversations, state information corresponding to newly-initiated stateful conversations in the state cache, wherein the state information for a stateful conversation comprises an affinity relation entry describing the providing node location to which previous web service invocation messages of the stateful conversation have been routed,
exchange state information with one or more remote control points,
route web service invocation messages associated with stateful conversations to providing nodes based at least in part on affinity relation entries in the state cache,
transmit affinity fault messages to the one or more remote control points including information corresponding to a second web service invocation message associated with a first existing stateful conversation for which no state information is stored in the state cache, and
transmit the second web service invocation message to the remote control points of the one or more control points that respond to the affinity fault messages.

2. The apparatus of claim 1 wherein the control point is operative, in response to an affinity fault message identifying a third web service invocation message associated with a second stateful interaction, to:
scan the state cache for state information corresponding to the third web service invocation message identified in the affinity fault message,
transmit a response to the affinity fault message, if the state cache includes information relating to the stateful interaction corresponding to the third web service invocation message,
receive the third web service invocation message and route the second message based at least in part on state information in the state cache.

3. The apparatus of claim 1 wherein the state information, for each stateful conversation, comprises a consuming node identifier, a provider node identifier, and a conversation token.

4. The apparatus of claim 3 wherein the control point is operative to: route requests associated with a stateful conversation to the providing node identified in the state information associated with the stateful conversation.

5. The apparatus of claim 1 wherein the stateful conversation is a SOAP Conversation.

6. The apparatus of claim 5 wherein the conversation token is a SOAP conversation identifier.

7. The apparatus of claim 1 wherein the control point is further operative to:
transmit state information relating to newly-initiated stateful conversations to the one or more remote control points; and
receive state information relating to stateful conversations from the one or more remote control points,
store the received state information in the state cache.

8. The apparatus of claim 7 wherein the control point is operative, as to web service invocation messages associated with stateful conversations for which no state information is stored in the state cache, to:
transmit affinity fault messages to the one or more remote control points including information associated with the messages,
transmit the messages to the remote control points of the one or more control points that respond to the affinity fault messages.

9. A web services network infrastructure supporting stateful conversations between consuming nodes and providing nodes, comprising:
at least two web services nodes, wherein each of the web services nodes comprises:
a state cache storing state information corresponding to at least one stateful conversation between a consuming node and a provider node;
a web services routing table comprising one or more routing table entries, the at least one routing table entry comprising a web service operation identifier and at least one endpoint location associated with the web service operation identifier; and,
a control point module operative to:
mediate the transport of web service invocation messages and web service response messages between consuming nodes and providing nodes,
access, responsive to a first web service invocation message of the web service invocation messages identifying a web service operation, the web services routing table to identify a providing node to which the first web service invocation message is to be routed;
detect stateful conversations between consuming nodes and providing nodes based on attributes of the web service invocation messages and the web service response messages transmitted between the consuming and providing nodes, wherein the attributes include a session, context, or conversation token,
store, responsive to detection of initiation of stateful conversations, state information corresponding to newly-initiated stateful conversations in the state cache, wherein the state information for a stateful conversation comprises an affinity relation entry describing the providing node location to which previous web service invocation messages of the stateful conversation have been routed,
exchange state information with other web services nodes of the at least two web services nodes,
route web service invocation messages associated with stateful conversations to providing nodes based at least in part on affinity relation entries in the state cache, transmit affinity fault messages to all other web services nodes of the at least two web services nodes including information corresponding to a second web service invocation message associated with a first existing stateful conversation for which no state information is stored in the state cache, and transmit the second web service invocation message to one or more of the other web services nodes of the at least two web services nodes that respond to the affinity fault messages.

10. The system of claim 9 wherein the control point is operative, in response to an affinity fault message identifying a third web service invocation message associated with a second stateful interaction, to:

scan the state cache for state information corresponding to the third web service invocation message identified in the affinity fault message, transmit a response to the affinity fault message, if the state cache includes information relating to the stateful interaction corresponding to the third web service invocation message, receive the third web service invocation message and route the third web service invocation message based at least in part on state information in the state cache.

11. The system of claim 9 wherein the state information, for each stateful conversation, comprises a consuming node identifier, a provider node identifier, and a conversation token.

12. The system of claim 11 wherein the control point is operative to: route requests associated with a stateful conversation to the providing node identified in the state information associated with the stateful conversation.

13. The system of claim 9 wherein the stateful conversation is a SOAP Conversation.

14. The system of claim 13 wherein the conversation token is a SOAP conversation identifier.

15. The system of claim 9 wherein the control point is further operative to:

transmit state information relating to newly-initiated stateful conversations to other web services nodes of the at least two web services nodes; and receive state information relating to stateful conversations from other web services nodes of the at least two web services nodes, store the received state information in the state cache.

16. The system of claim 15 wherein the control point is operative, as to web service invocation messages associated with stateful conversations for which no state information is stored in the state cache, to:

transmit affinity fault messages to the other web services nodes of the at least two web services nodes including information associated with the messages, transmit the messages to the one or more of the other web services nodes of the at least two web services nodes respond to the affinity fault messages.

17. The system of claim 9 further comprising a network publish/subscribe system operative to:

receive a fourth state information message posted to a topic, and distribute the fourth state information message to subscribers associated with the topic; and wherein the network publish/subscribe system is configured to include a state information topic to which the at least two web services nodes are subscribers; and wherein the control point is operative to exchange state information with other web services nodes of the at least two web services nodes by posting state information messages including state information to the state information topic.

18. The system of claim 17 wherein the state information topic is an affinity fault topic.

19. The system of claim 17 wherein the state information topic is an affinity relation entry topic.

* * * * *